United States Patent
Wang

(10) Patent No.: US 9,367,332 B2
(45) Date of Patent: Jun. 14, 2016

(54) SENSING DATA READING DEVICE AND METHOD

(71) Applicant: GETAC TECHNOLOGY CORPORATION, Hsinchu County (TW)

(72) Inventor: Chun-Chi Wang, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 328 days.

(21) Appl. No.: 14/256,831

(22) Filed: Apr. 18, 2014

(65) Prior Publication Data

US 2015/0301834 A1 Oct. 22, 2015

(51) Int. Cl.
G06F 9/44 (2006.01)
G06F 9/445 (2006.01)

(52) U.S. Cl.
CPC ............ *G06F 9/441* (2013.01); *G06F 9/44505* (2013.01)

(58) Field of Classification Search
CPC ................................ G06F 9/441; G06F 9/4405
See application file for complete search history.

(56) References Cited

U.S. PATENT DOCUMENTS

| | | | | |
|---|---|---|---|---|
| 8,312,476 | B2* | 11/2012 | Chin | G06F 9/54 719/319 |
| 8,868,899 | B2* | 10/2014 | Galicia | G06F 9/45533 713/1 |
| 9,052,920 | B2* | 6/2015 | Ting | G06F 9/4411 |
| 9,256,563 | B2* | 2/2016 | Ting | G06F 13/4022 |

* cited by examiner

*Primary Examiner* — Stefan Stoynov

(57) ABSTRACT

A sensing data reading device and method applied to an electronic device are provided. The sensing data reading device supports a first operating system and a second operating system. The sensing data reading device includes: a sensing module for generating at least a sensing data; a hub coupled to the sensing module and adapted to read at least a sensing data; and a control circuit coupled to the sensing module and the hub to read at least a sensing data directly as soon as the electronic device switches to the first operating system and send a control signal to the hub as soon as the electronic device switches to the second operating system such that the hub reads the at least a sensing data. The sensing data reading device and method dispense with a switch circuit, thereby saving circuit area and cutting costs.

16 Claims, 2 Drawing Sheets

SENSING DATA READING DEVICE AND METHOD

BACKGROUND OF THE INVENTION

1. Field of the Invention

The present invention relates to sensing data reading devices and methods, and more particularly, to a sensing data reading device and method applied to various operating systems.

2. Description of the Prior Art

Regarding the operation principle of computers, hardware executes the computers, whereas software includes an operating system kernel, an operating system (OS), and applications. The operating system kernel controls hardware to operate well, for example, allowing the CPU to receive commands, and rendering the hard disk drive accessible. The operating system allows program developers to develop applications on the operating system kernel equipped with a driver. The applications enhance the ease of communication between the operating system kernel and an user, for example, by means of a text command mode and a graphic mode.

Portable electronic devices, which include a wide variety of notebook computers and smartphones, are indispensable to people's daily life nowadays. Conventionally, the portable electronic devices operate mostly on Microsoft's Windows operating system, though Linux-based Android operating system is becoming more popular. The performance of aforesaid two operating systems varies, depending on the task they are handling. To combine their advantages, the aforesaid two operating systems are integrated into a single electronic device.

For instance, Taiwan Patent Application 101134871 discloses a method sharing a peripheral device by dual operating systems and an electronic device applied to the method. Referring to FIG. 1 and the specification, page 4, lines 15-21 of Taiwan Patent Application 101134871, an electronic device 100 comprises a first operating system 110, a second operating system 120, a controller 130 and a peripheral device 140. The controller 130 is a standalone embedded controller (EC) connected to the two operating systems 110, 120 and the peripheral device 140 and adapted to control the peripheral devices 140 in accordance with commands issued by the two operating systems 110, 120, respectively.

In an ideal embodiment, a first synchronization manager 112 and a second synchronization manager 122 operate on the first operating system 110 and the second operating system 120, respectively. The two synchronization managers 112, 122 are dedicated to orchestrating the switching between the two operating systems 110, 120 so as to facilitate information synchronization there between. The two synchronization managers 112, 122 are each connected to the controller 130 and are connected to each other by a transmission interface 150.

As indicated above, with the first and second synchronization managers 112, 122 being capable of orchestrating the switching between the first operating system 110 and the second operating system 120, the first operating system 110 issues a command to the controller 130 as soon as the electronic device 100 switches to the first operating system 110, thereby driving the controller 130 to control the peripheral devices 140.

However, according to Taiwan Patent Application 101134871, the controller 130 cannot control the peripheral devices 140 without the first synchronization manager 112 and the second synchronization manager 122. As a result, the first synchronization manager 112 and the second synchronization manager 122 require a switch circuit, thereby adding to circuit complexity and costs.

Accordingly, it is imperative to solve the aforesaid problems by putting forth a novel sensing data reading device and method which dispense with a switch circuit so as to simplify circuit and save circuit area.

SUMMARY OF THE INVENTION

It is an objective of the present invention to provide a sensing data reading device and method, characterized in that, depending on which of two operating systems an electronic device switches to, a control circuit reads a sensing data directly or controls a hub to read a sensing data and thus dispenses with a switch circuit, thereby saving circuit area and cutting costs.

The sensing data reading device of the present invention is applied to an electronic device and adapted to support a first operating system and a second operating system. The sensing data reading device comprises a sensing module, a hub, and a control circuit. The sensing module generates at least a sensing data. The hub is coupled to the sensing module to read at least a sensing data. The control circuit is coupled to the sensing module and the hub. The control circuit reads at least a sensing data directly as soon as the electronic device switches to a first operating system. The control circuit sends a control signal to the hub as soon as the electronic device switches to the second operating system such that the hub reads at least a sensing data. Hence, the present invention dispenses with a switch circuit, thereby saving circuit area and cutting costs.

The sensing data reading method of the present invention is applied to an electronic device. As soon as the electronic device boots, a sensing data reading device is provided in the sensing data reading method comprising the steps of: providing a sensing data reading device, wherein the sensing data reading device comprises a sensing module adapted to generate at least a sensing data and coupled to a hub so as to read at least a sensing data and a control circuit coupled to the sensing module and the hub; querying a basic input/output system (BIOS), wherein the BIOS supports a first operating system and a second operating system; reporting to the control circuit according to the operating system currently supported by the BIOS to determine that the electronic device is to switch to one of the first operating system and the second operating system; reading at least a sensing data directly if the electronic device switches to the first operating system; and sending a control signal to the hub if the electronic device switches to the second operating system such that the hub reads at least a sensing data. Hence, the present invention dispenses with a switch circuit, thereby saving circuit area and cutting costs.

BRIEF DESCRIPTION OF THE DRAWINGS

Features and achievable advantages of the present invention are hereunder illustrated with specific embodiments in conjunction with the accompanying drawings, in which.

DETAILED DESCRIPTION OF THE EMBODIMENTS

Specific elements of the present invention are referred to with terminology used in the specification and claims of the present invention. Persons skilled in the art understand that hardware manufacturers may refer to the same element by different names. In the specification and claims of the present invention, different elements are distinguished from each other by function rather than name. Furthermore, the meaning of the word "couple" used in the specification and claims of the present invention includes any means of direct and indirect electrical connection. Hence, if the specification and claims of the present invention state that a first device is coupled to a second device, it will mean that the first device is directly electrically connected to the second device or indirectly electrically connected to the second device by another device or a means of connection.

Figure 1:
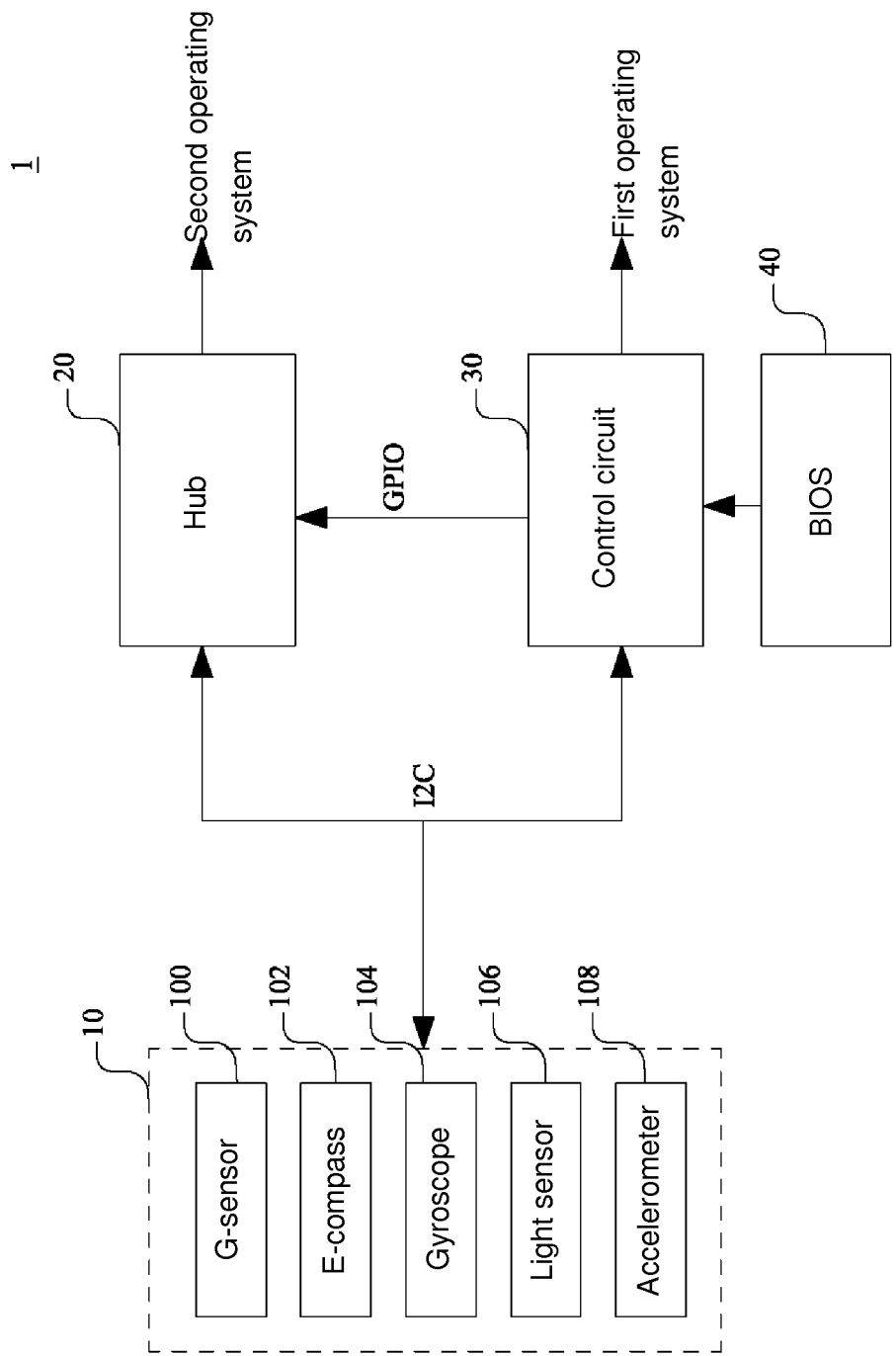
FIG. 1 is a block diagram of a sensing data reading device according to an embodiment of the present invention.

Referring to FIG. 1, there is shown a block diagram of a sensing data reading device according to an embodiment of the present invention. As shown in the diagram, the sensing data reading device of the present invention is applied to an electronic device 1. The sensing data reading device supports a first operating system and a second operating system. The sensing data reading device comprises a sensing module 10, a hub 20, and a control circuit 30. The sensing module 10 generates at least a sensing data. In this embodiment, the sensing module 10 comprises a plurality of sensing units. The sensing units each generate a sensing data. The sensing units include a G-sensor 100, an E-compass 102, a gyroscope 104, a light sensor 106, and an accelerometer 108. The G-sensor 100, the E-compass 102, the gyroscope 104, the light sensor 106, and the accelerometer 108 are applied to the electronic device 1 to sense the status of operation of the electronic device 1 so as to generate the sensing data accordingly.

The hub 20 is coupled to the sensing module 10 and reads at least a sensing data from the sensing module 10. In this embodiment, although the sensing module 10 comprises the G-sensor 100, the E-compass 102, the gyroscope 104, the light sensor 106, and the accelerometer 108, the data contained in the sensing module 10 is not restrictive of the present invention.

The control circuit 30 is coupled to the sensing module 10 and the hub 20. The control circuit 30 directly reads at least a sensing data sent from the sensing module 10 as soon as the electronic device 1 switches to a first operating system (such as windows 7). The control circuit 30 sends a control signal to the hub 20 as soon as the electronic device 1 switches to a second operating system (such as windows 8), such that the hub 20 reads at least a sensing data sent from the sensing module 10. Hence, the present invention dispenses with a switch circuit, thereby saving circuit area and cutting costs.

When booting begins, the control circuit 30 queries a basic input/output system (BIOS) 40 of the electronic device 1 and then determines that the electronic device 1 is to switch to one of the first operating system and the second operating system. That is to say, as soon as the electronic device 1 boots, the BIOS 40 obtains the user configures that the electronic device 1 desires to switch to the first operating system or the second operating system; hence, after the control circuit 30 has queried the BIOS 40, the BIOS 40 reports to the control circuit 30 in order to know whether the electronic device 1 is to switch to the first operating system or the second operating system, so as to determine that the electronic device 1 is to switch to the first operating system or the second operating system.

As soon as the electronic device 1 switches to the first operating system, the control circuit 30 disables the hub 20, and the control circuit 30 directly reads at least a sensing data through a bus. In this embodiment, the control circuit 30 disables the hub 20 through a general-purpose input/output (GPIO) and causes the control circuit 30 to directly read the sensing data of the sensing module 10 through a bus of an Inter-Integrated Circuit ($I^2C$).

By contrast, as soon as the electronic device 1 switches to the second operating system, the control circuit 30 enables the hub 20 and independently disables transmission of data from a bus, such that the hub 20 reads the sensing data of the sensing module 10 through the bus. In this embodiment, the control circuit 30 enables the hub 20 through the GPIO, such that the hub 20 reads the sensing data of the sensing module 10 through the bus of the $I^2C$.

Hence, the present invention is advantageously characterized in that the control circuit 30 reads a sensing data directly or controls the hub 20 to read the sensing data according to which operating system an electronic device 1 is operating on, so as to dispense with a switch circuit, thereby saving circuit area and cutting costs.

Figure 2:
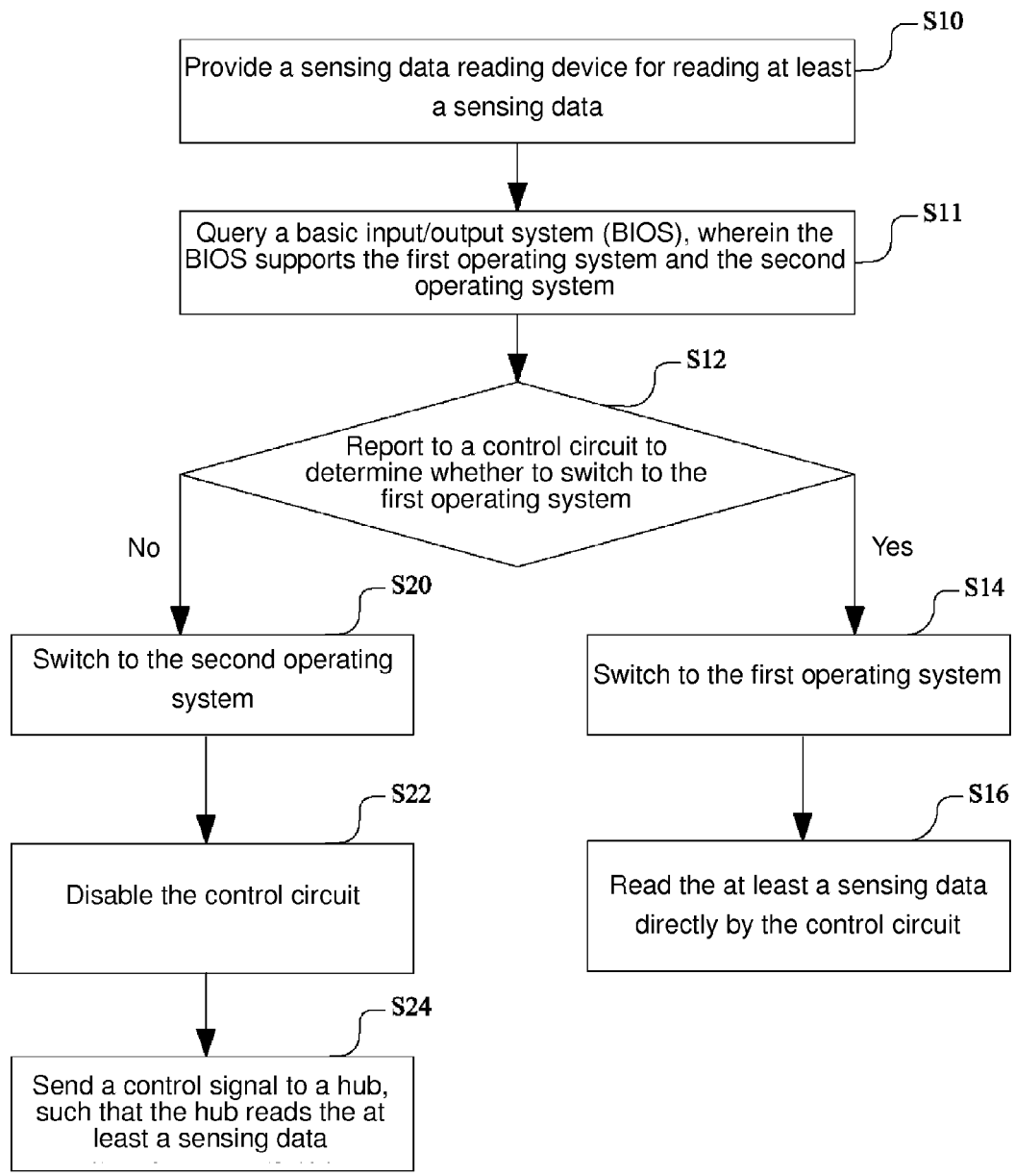
FIG. 2 is a flow chart of a sensing data reading method according to an embodiment of the present invention.

Referring to FIG. 2, there is shown a flow chart of a sensing data reading method according to an embodiment of the present invention. As shown in the diagram, the sensing data reading method of the present invention is applied to a sensing data reading device of the electronic device 1, wherein the sensing data reading device comprises a sensing module, a hub, and a control circuit. The sensing data reading method of the present invention is described in detail below.

As soon as the booting of the electronic device 1 begins, the process flow of the sensing data reading method of the present invention comprises the steps described hereunder. Step S10 involves providing a sensing data reading device for reading at least a sensing data. The sensing data reading device comprises the sensing module 10, the hub 20, and the control circuit 30. The sensing module 10 generates at least a sensing data. The hub 20 reads at least a sensing data of the sensing module 10. The control circuit 30 is coupled to the sensing module 10 and the hub 20. Afterward, step S11 involves querying the BIOS 40, wherein before the BIOS 40 begins to support the first operating system and the second operating system, the BIOS 40 must determine whether the electronic device 1 is to switch to the first operating system (such as windows 7) or the second operating system (such as windows 8). Hence, the reading method of the sensing data reading device entails querying the BIOS 40 through the control circuit 30 and thus determines that the electronic device 1 is to switch to the first operating system or the second operating system.

Afterward, in step S12, the BIOS 40 reports to the control circuit 30 to determine whether the electronic device 1 is to switch to the first operating system. Hence, after the control circuit 30 has queried the BIOS 40, the BIOS 40 reports to the control circuit 30 whether the electronic device 1 is to switch to the first operating system or the second operating system. If the report to the control circuit 30 is "YES", the process flow of the reading method will go to the first operating system in step S14. If the report to the control circuit 30 is "NO", the process flow of the reading method will go to the second operating system in step S20.

In step S14, the electronic device 1 switches to the first operating system. Afterward, in step S16, the control circuit 30 directly reads at least a sensing data of the sensing module 10 through the bus. Since the electronic device 1 has switched to the first operating system, the control circuit 30 disables the hub 20 in order to prevent the hub 20 from reading the sensing data of the sensing module 10.

In step S20, the electronic device 1 switches to the second operating system. Afterward, in step S22, since the electronic device 1 has switched to the second operating system, the control circuit 30 enables the hub 20 and independently disables transmission of data from the bus so as to prevent the control circuit 30 from reading the sensing data of the sensing module 10 directly. Afterward, in step S24, the control circuit 30 sends a control signal to the hub 20, such that the hub 20 reads at least a sensing data of the sensing module 10. Hence, the sensing data reading method of the present invention is characterized in that, depending on which operating system the electronic device 1 switches to, the control circuit 30 directly reads a sensing data or controls the hub 20 to read a sensing data and thus dispenses with a switch circuit, thereby saving circuit area and cutting costs.

In conclusion, the sensing data reading device of the present invention comprises a sensing module, a hub, and a control circuit. The sensing data reading method of the present invention is characterized in that: a sensing module generates at least a sensing data; a hub is coupled to the sensing module and adapted to read at least a sensing data; and a control circuit is coupled to the sensing module and the hub, such that the control circuit directly reads at least a sensing data as soon as an electronic device switches to the first operating system; and the control circuit sends a control signal to the hub, such that the hub reads at least a sensing data as soon as the electronic device switches to the second operating system. Hence, the present invention dispenses with a switch circuit, thereby saving circuit area and cutting costs.

The present invention has novelty, non-obviousness, and high industrial applicability and thus meets patentability requirements.

Although the present invention is illustrated with a preferred embodiment, the preferred embodiment is not restrictive of the scope of the implementation of the present invention. All equivalent variations and modifications made to the spirit, features, structures and shapes described in the claims of the present invention must be interpreted to fall within the scope of the present invention.

What is claimed is:

1. A sensing data reading device applied to an electronic device and adapted to support a first operating system and a second operating system, the sensing data reading device comprising:
   a sensing module for generating at least a sensing data;
   a hub coupled to the sensing module and adapted to read the at least a sensing data; and
   a control circuit coupled to the sensing module and the hub to read the at least a sensing data directly as soon as the electronic device switches to the first operating system and send a control signal to the hub as soon as the electronic device switches to the second operating system such that the hub reads the at least a sensing data.

2. The sensing data reading device of claim 1, wherein the control circuit queries a basic input/output system (BIOS) supporting the first operating system and the second operating system to determine that the electronic device is to switch to one of the first operating system and the second operating system.

3. The sensing data reading device of claim 2, wherein the BIOS reports to the control circuit to determine that the electronic device is to switch to one of the first operating system and the second operating system.

4. The sensing data reading device of claim 3, wherein, as soon as the electronic device switches to the first operating system, the control circuit disables the hub, and the control circuit directly reads the at least a sensing data through a bus.

5. The sensing data reading device of claim 4, wherein the control circuit disables the hub through a general-purpose input/output (GPIO) and causes the control circuit to directly read the at least a sensing data through the bus.

6. The sensing data reading device of claim 3, wherein, as soon as the electronic device switches to the second operating system, the control circuit enables the hub and independently disables transmission of data from a bus, such that the hub reads the at least a sensing data through the bus.

7. The sensing data reading device of claim 6, wherein the control circuit enables the hub through a general-purpose input/output (GPIO), such that the hub reads the at least a sensing data through the bus.

8. The sensing data reading device of claim 1, wherein the sensing module comprises a plurality of sensing units, the sensing units generating the at least a sensing data, respectively.

9. The sensing data reading device of claim 8, wherein the sensing units include a G-sensor, an E-compass, a gyroscope, a light sensor, and an accelerometer.

10. A sensing data reading method applied to an electronic device such that, as soon as the electronic device boots, the sensing data reading method comprises the steps of:
   providing a sensing data reading device comprising:
   a sensing module for generating at least a sensing data;
   a hub coupled to the sensing module and adapted to read the at least a sensing data; and
   a control circuit coupled to the sensing module and the hub;
   querying a basic input/output system (BIOS), wherein the BIOS supports the first operating system and the second operating system; and
   reporting to the control circuit to determine that the electronic device is to switch to one of the first operating system and the second operating system, depending on which operating system is currently being supported by the BIOS, reading the at least a sensing data directly if the electronic device switches to the first operating system, and sending a control signal to the hub if the electronic device switches to the second operating system such that the hub reads the at least a sensing data.

11. The sensing data reading method of claim 10, wherein, in the step of querying a BIOS, the control circuit queries the BIOS.

12. The sensing data reading method of claim 11, wherein, as soon as the electronic device switches to the first operating system, the control circuit disables the hub, and the control circuit reads the at least a sensing data through a bus.

13. The sensing data reading device of claim 12, wherein the control circuit disables the hub through a general-purpose input/output (GPIO) and causes the control circuit to directly read the at least a sensing data through the bus.

14. The sensing data reading method of claim 11, wherein, as soon as the electronic device switches to the second operating system, the control circuit enables the hub and independently disables transmission of data from a bus, such that the hub reads the at least a sensing data through the bus.

15. The sensing data reading device of claim 14, wherein the control circuit enables the hub through a general-purpose input/output (GPIO) and causes the hub to read the at least a sensing data through the bus.

16. The sensing data reading method of claim 10, wherein the sensing module comprises a plurality of sensing units, the sensing units generating the at least a sensing data, respectively.

* * * * *